(12) United States Patent
Numata et al.

(10) Patent No.: US 10,616,493 B2
(45) Date of Patent: Apr. 7, 2020

(54) MULTI CAMERA SYSTEM FOR ZOOM

(71) Applicant: HUAWEI TECHNOLOGIES CO., LTD., Shenzhen (CN)

(72) Inventors: Hajime Numata, Yokohama (JP); Wei Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/329,224

(22) PCT Filed: Aug. 31, 2016

(86) PCT No.: PCT/CN2016/097567
§ 371 (c)(1),
(2) Date: Feb. 28, 2019

(87) PCT Pub. No.: WO2018/039985
PCT Pub. Date: Mar. 8, 2018

(65) Prior Publication Data
US 2019/0253634 A1    Aug. 15, 2019

(51) Int. Cl.
*H04N 5/232*    (2006.01)
*H04N 5/225*    (2006.01)
(Continued)

(52) U.S. Cl.
CPC ....... *H04N 5/23296* (2013.01); *G06T 3/4015* (2013.01); *G06T 5/50* (2013.01);
(Continued)

(58) Field of Classification Search
CPC .. H04N 5/23296; H04N 9/045; H04N 5/2258; H04N 5/247; H04N 9/04515;
(Continued)

(56) References Cited

U.S. PATENT DOCUMENTS 9,319,585 B1 *  4/2016  Liu .......................... H04N 9/07
2006/0187312 A1  8/2006  Labaziewicz et al.
(Continued)

FOREIGN PATENT DOCUMENTS

CN    1747556 A    3/2006
CN  101309360 A   11/2008
(Continued)

*Primary Examiner* — Lin Ye
*Assistant Examiner* — Chan T Nguyen
(74) *Attorney, Agent, or Firm* — Kilpatrick Townsend & Stockton LLP

(57) ABSTRACT

A camera: a first camera including a first lens and a color image sensor covered with color filters located in front of square pixels; a second camera including a second lens and a mono color image sensor having square pixels, with a pixel arrangement of the mono color image sensor rotated by 45 degrees with respect to a pixel arrangement of the color image sensor; a first interpolation means for interpolating signals outputted from the color image sensor, converting the interpolated signals into color difference signals, and outputting the color difference signals; a second interpolation means for interpolating signals outputted from the mono color image sensor and outputting interpolated luminance signals; a first cropping means for cropping the color difference signals; a second cropping means for cropping the interpolated luminance signals; and a color image signal processing means for fusing the cropped color difference signals and the cropped luminance signals.

10 Claims, 6 Drawing Sheets

(51) Int. Cl.
  *H04N 9/04*   (2006.01)
  *G06T 3/40*   (2006.01)
  *G06T 5/50*   (2006.01)
  *G06T 11/00*  (2006.01)
  *H04N 5/247*  (2006.01)

(52) U.S. Cl.
  CPC ......... *G06T 11/001* (2013.01); *H04N 5/2258* (2013.01); *H04N 5/247* (2013.01); *H04N 9/045* (2013.01); *H04N 9/04515* (2018.08); *H04N 9/04551* (2018.08); *G06T 2207/20221* (2013.01); *G06T 2207/20224* (2013.01); *G06T 2210/22* (2013.01)

(58) Field of Classification Search
  CPC ..... H04N 9/04551; G06T 11/001; G06T 5/50; G06T 3/4015; G06T 2210/22; G06T 2207/20224; G06T 2207/20221
  USPC ..................................................... 348/240.99
  See application file for complete search history.

(56) References Cited

U.S. PATENT DOCUMENTS

| | | | |
|---|---|---|---|
| 2007/0013786 A1 | 1/2007 | Chiba et al. | |
| 2007/0182840 A1 | 8/2007 | Monroe | |
| 2008/0030592 A1 | 2/2008 | Border et al. | |
| 2008/0284880 A1 | 11/2008 | Numata | |
| 2008/0316329 A1 | 12/2008 | Kim et al. | |
| 2010/0013906 A1 | 1/2010 | Border et al. | |
| 2010/0097514 A1 | 4/2010 | McCarten et al. | |
| 2010/0245636 A1 | 9/2010 | Kumar et al. | |
| 2012/0026366 A1* | 2/2012 | Golan ............... | H04N 5/232 348/240.2 |
| 2012/0044328 A1 | 2/2012 | Gere | |
| 2013/0168795 A1 | 7/2013 | Tuulos et al. | |
| 2013/0214130 A1 | 8/2013 | Miyahara | |
| 2014/0160326 A1 | 6/2014 | Black | |
| 2014/0232894 A1 | 8/2014 | Olsen et al. | |
| 2015/0085174 A1* | 3/2015 | Shabtay ............. | H04N 5/23296 348/336 |
| 2015/0098005 A1 | 4/2015 | Tsai et al. | |
| 2015/0116569 A1 | 4/2015 | Mercado | |
| 2016/0227195 A1 | 8/2016 | Venkataraman et al. | |

FOREIGN PATENT DOCUMENTS

| | | |
|---|---|---|
| CN | 101427372 A | 5/2009 |
| CN | 102037717 A | 4/2011 |
| CN | 102077575 A | 5/2011 |
| CN | 102177585 A | 9/2011 |
| CN | 102365860 A | 2/2012 |
| CN | 102378015 A | 3/2012 |
| CN | 103098214 A | 5/2013 |
| CN | 104519327 A | 4/2015 |
| CN | 105323567 A | 2/2016 |
| CN | 105721841 A | 6/2016 |
| EP | 2852150 A1 | 3/2015 |

* cited by examiner

Figure 7

MULTI CAMERA SYSTEM FOR ZOOM

CROSS-REFERENCE TO RELATED APPLICATIONS

This application is a national stage of International Application No. PCT/CN2016/097567, filed on Aug. 31, 2016, which is hereby incorporated by reference in its entirety.

TECHNICAL FIELD

The present application relates to a camera built into a smartphone or any other apparatus, and particularly to a camera having a zoom function.

BACKGROUND

At present, most smartphones each have a camera built therein. The performance of the camera built into a smartphone has been improved and is now comparable to the performance of a digital still camera (DSC) and a digital single lens reflex camera (DSLR camera). To further expand the range of the application of the camera built into a smartphone, a high-quality zoom function has been increasingly required.

In general, the camera built into a smartphone uses a fixed focal lens instead of a zoom lens due to restriction on the size and thickness. The zoom function is achieved as follows:
1. Electronic Signal Processing Part of an entire captured image is cropped and electronically enlarged and further caused to undergo sharpness control, super-resolution processing, and other types of detail/resolution enhancement.
2. Use of Two Cameras Two cameras, a wide-angle camera and a telephoto camera, are used. Two images from the two cameras are combined with each other in accordance with the zoom position.

A problem with the method described in the above item 1 is a decrease in resolution because an image is cropped. For example, when an image sensor having a total pixel number of 8 M is used to capture an image of 2× zoom magnification, the number of pixels of the enlarged image undesirably decreases to 2 M. The decrease in the number of pixels lowers the resolution and therefore loses information on details and texture. Even when sharpness control and super-resolution processing are performed, it cannot be said that a lossless zoom function is achieved, and image quality of details is inferior to that achieved by optical zooming.

The method described in the above item 2 has a problem of design (exterior appearance) of the smartphone because a telephoto lens has a long focal length. When a telephoto lens is built into a thin smartphone, the portion where the telephoto lens is built in is thicker than the other portion, resulting in deterioration in exterior appearance.

SUMMARY

An object of the present invention is to provide a zoom camera that not only produces an image the image quality of which is not lost or lost only by a small amount even when the image is zoomed up but also has a thin exterior appearance maintained.

A first aspect of the present invention provides a zoom camera. The zoom camera comprises two cameras: a first camera and a second camera. The first camera includes a first lens and a color image sensor covered with color filters located in front of square pixels. The second camera includes a second lens and a mono color image sensor having square pixels, with a pixel arrangement of the mono color image sensor rotated by 45 degrees with respect to a pixel arrangement of the color image sensor. The zoom camera further comprises a first interpolation means for interpolating signals outputted from the color image sensor, converting the interpolated signals into color difference signals, and outputting the color difference signals; a second interpolation means for interpolating signals outputted from the mono color image sensor and outputting interpolated luminance signals; a first cropping means for cropping the color difference signals;

a second cropping means for cropping the interpolated luminance signals; and a color image signal processing means for fusing the cropped color difference signals and the cropped luminance signals.

When Bayer patterned color filters are used, both interpolation of signals outputted from the pixels each covered with a green filter in the color image sensor performed by the first interpolation means and interpolation of signals performed by the second interpolation means may use the same algorithm.

A focal length of the second lens may be longer than a focal length of the first lens.

A total number of pixels provided in the mono color image sensor may be substantially equal to a total number of pixels provided in the color image sensor.

A total number of pixels provided in the mono color image sensor may be greater than a total number of pixels provided in the color image sensor.

A second aspect of the present invention provides a zoom camera. The zoom camera comprises two cameras: a first camera and a second camera.

The first camera includes a first lens and a color image sensor covered with color filters located in front of square pixels.

The second camera includes a second lens and a mono color image sensor having square pixels, with a pixel arrangement of the mono color image sensor rotated by 45 degrees with respect to a pixel arrangement of the color image sensor.

The zoom camera further comprises a first interpolation means for interpolating signals outputted from the color image sensor, converting the interpolated signals into color difference signals and low-frequency luminance signals, and outputting the color difference signals and the low-frequency luminance signals;

a second interpolation means for interpolating signals outputted from the mono color image sensor and outputting high-frequency luminance signals;

a luminance signal fusing means for fusing the low-frequency luminance signals and the high-frequency luminance signals and outputting fused luminance signals;

a first cropping means for cropping the color difference signals;

a second cropping means for cropping the fused luminance signals; and a color image signal processing means for fusing the cropped color difference signals and the cropped luminance signals.

BRIEF DESCRIPTION OF DRAWINGS

FIG. 7 shows a second embodiment of the present invention.

DESCRIPTION OF EMBODIMENTS

The camera in a smartphone and any other similar apparatus typically uses a single-plate image sensor for cost and other reasons. Each pixel of the image sensor only provides information on the luminance of light. To produce a color image, the pixels are covered with color filters of three colors (red, green, and blue). The pattern in accordance with which the color filters are arranged is typically the Bayer pattern.

Figure 1:
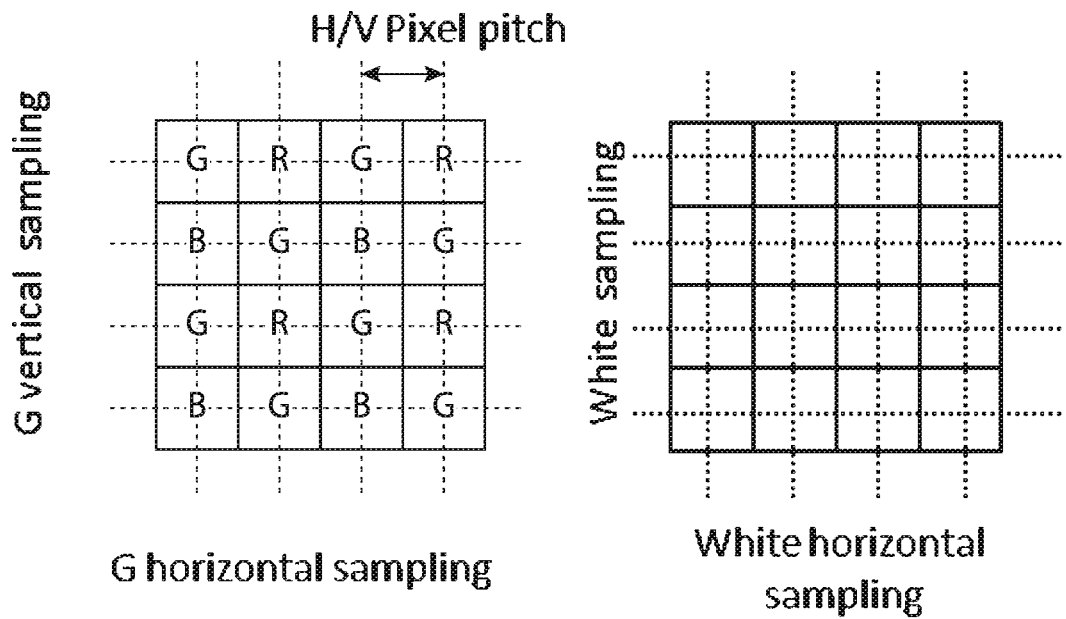
FIG. 1 shows a color image sensor covered with Bayer-patterned color filters and a black/white (B/W) image sensor covered with no color filter.

FIG. 1 shows a color image sensor covered with Bayer-patterned color filters and a black/white (B/W) image sensor covered with no color filter. The black/white image sensor used herein is a sensor that detects the grey level of light, and comprises a mono color image sensor. Each pixel typically has a square shape. Assuming that each side of each pixel has a length of 1, the inter-pixel pitch is also 1.

In the Bayer-patterned color filter configuration, color filters of the three colors are arranged on 2×2=4 pixels. Since the human eye is most sensitive to green, the green signal most greatly contributes to the luminance signal (Y signal). Therefore, green is assigned to two pixels, and red and blue are assigned to the other two pixels respectively. The green pixels are arranged in the checkered pattern. That is, as shown in FIG. 1, the green (G) pixel and the red (R) or blue (B) pixel are arranged alternately.

Since one pixel produces only one color signal, the other two color signals are produced by using an image signal processor (ISP) to perform interpolation (de-mosaic) of signals produced by the surrounding pixels. For example, a set of three color signals at the position of $G_{22}$ pixel shown in FIG. 1 is as follows:

Green signal=$G_{22}$

Red signal=$(R_{12}+R_{32})/2$

Blue signal=$(B_{21}+B_{23})/2$

The composite color signal at the position of $G_{22}$ pixel is composited by the above-mentioned green, red, and blue signals. A luminance signal Y at the position of $G_{22}$ pixel is obtained by transforming a set of green, red, and blue signals to a set of the luminance signal Y and color difference signals Cb and Cr.

Figure 2:
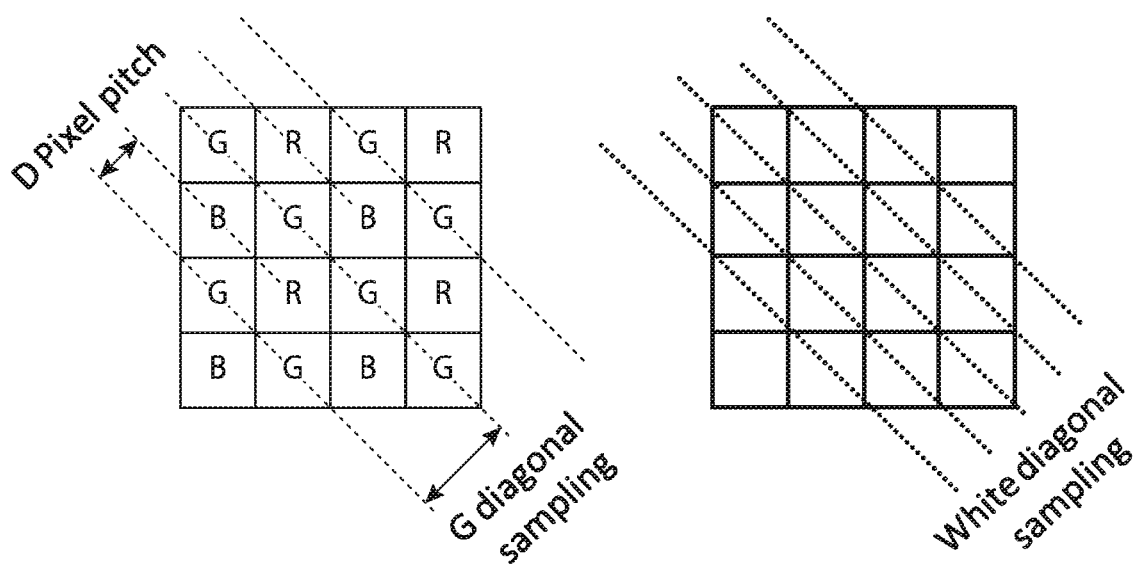
FIG. 2 shows pixel arrangement in the diagonal direction.

Referring to FIG. 2 showing pixel arrangement in the diagonal direction, a green row and a red/blue row are alternately arranged in the diagonal direction of the color image sensor.

The luminance signals from a color image sensor are typically determined by the signals from the green pixels, although enhanced by the signals from the red and blue pixels in some cases. The pitch between the green pixels is twice the pitch between the pixels of the black/white image sensor. Therefore, as far as the luminance signals are concerned, the resolution of the color image sensor is half the resolution of the black/white image sensor.

Figure 3:
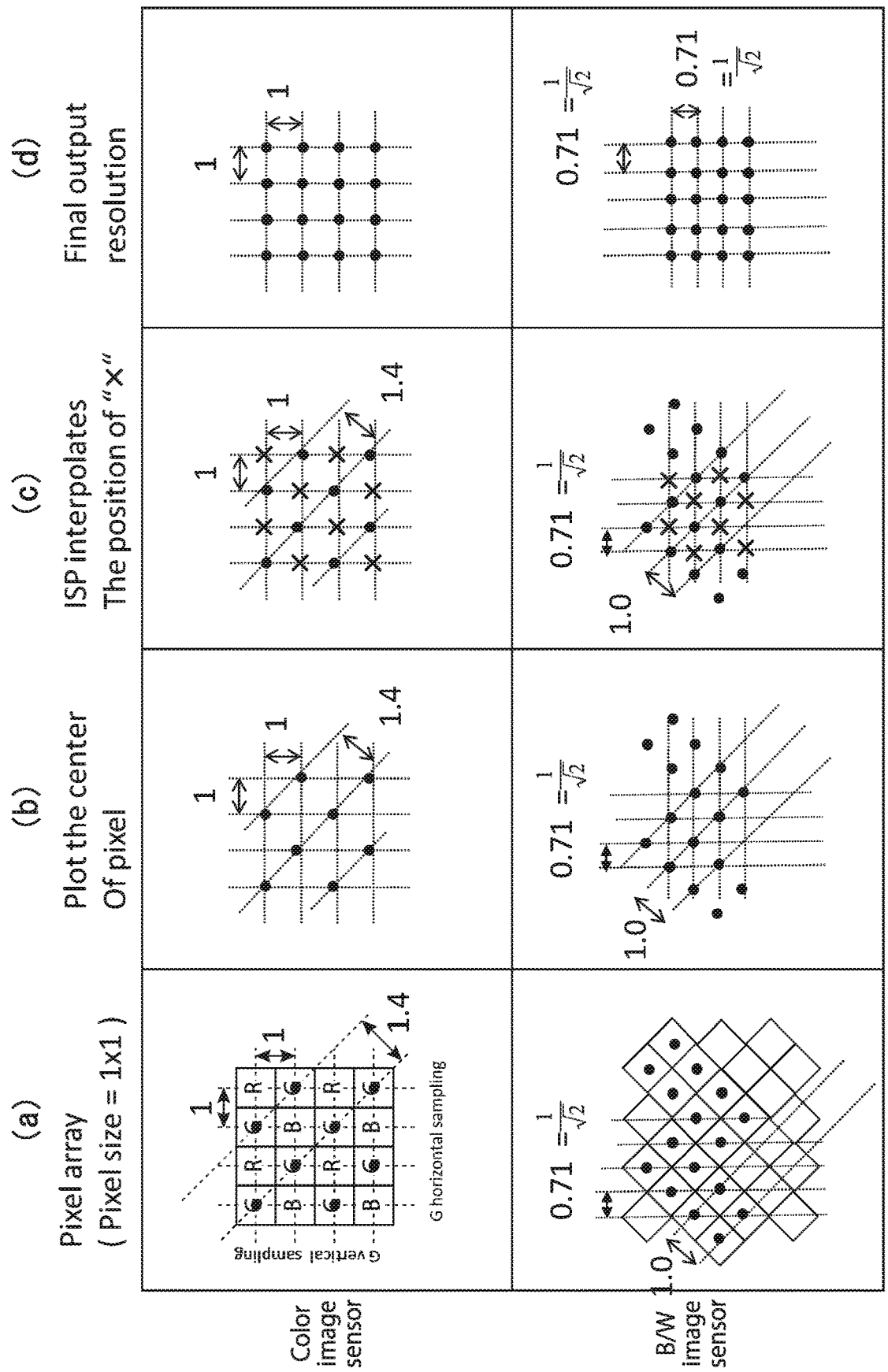
FIG. 3 shows a color image sensor and a black/white image sensor in an embodiment of the present invention.

FIG. 3 shows a color image sensor and a black/white image sensor in an embodiment of the present invention. A zoom camera according to an embodiment of the present invention includes two cameras. A first camera has a built-in color image sensor covered with Bayer-patterned color filters, and a second camera has a built-in black/white image sensor. The color image sensor and the black/white image sensor may have the same pixel size or different pixel sizes, and the following description will be made with reference to the case where they have the same pixel size for ease of description. The color image sensor and the black/white image sensor have the same square shape pixels. Assuming that each side of each pixel has a length of 1, the inter-pixel pitch is also 1.

The pixel arrangement in the black/white image sensor is rotated by 45 degrees with respect to the pixel arrangement in the color image sensor, as shown in FIG. 3 (a).

The green pixels in the color image sensor and the pixels in the black/white image sensor are arranged in the same shape, as shown in FIG. 3 (b). The inter-pixel pitch in the diagonal direction is, however, 1.4 in the color image sensor and 1.0 in the black/white image sensor.

In the lower figure of FIG. 3 (c), imaginary pixels created by the interpolation are shown between the real pixels in the black/white image sensor. On the other hand, in the color image sensor, the composite color signal at the position of each pixel includes the interpolation of signals produced by the surrounding pixels. The pitch between pixels after the interpolation is 1 in the color image sensor and 0.71 in the black/white image sensor, as shown in FIG. 3 (d). It is assumed that the phrase "pixels after the interpolation" include imaginary pixels created by the interpolation. The post-interpolation resolution obtained from the black/white image sensor is 1.4 times the post-interpolation resolution obtained from the color image sensor. Therefore, even when an interpolated image obtained from the black/white image sensor is cropped and then enlarged by a factor of 1.4, the resolution of the enlarged image is equal to the resolution of an interpolated image obtained from the color image sensor. Since the sensitivity of the black/white image sensor is higher than the sensitivity of the color image sensor by the amount reduced by the color filters, the signal to noise ratio (SNR) of the black/white image sensor is also higher than that of the color image sensor.

Figure 4:
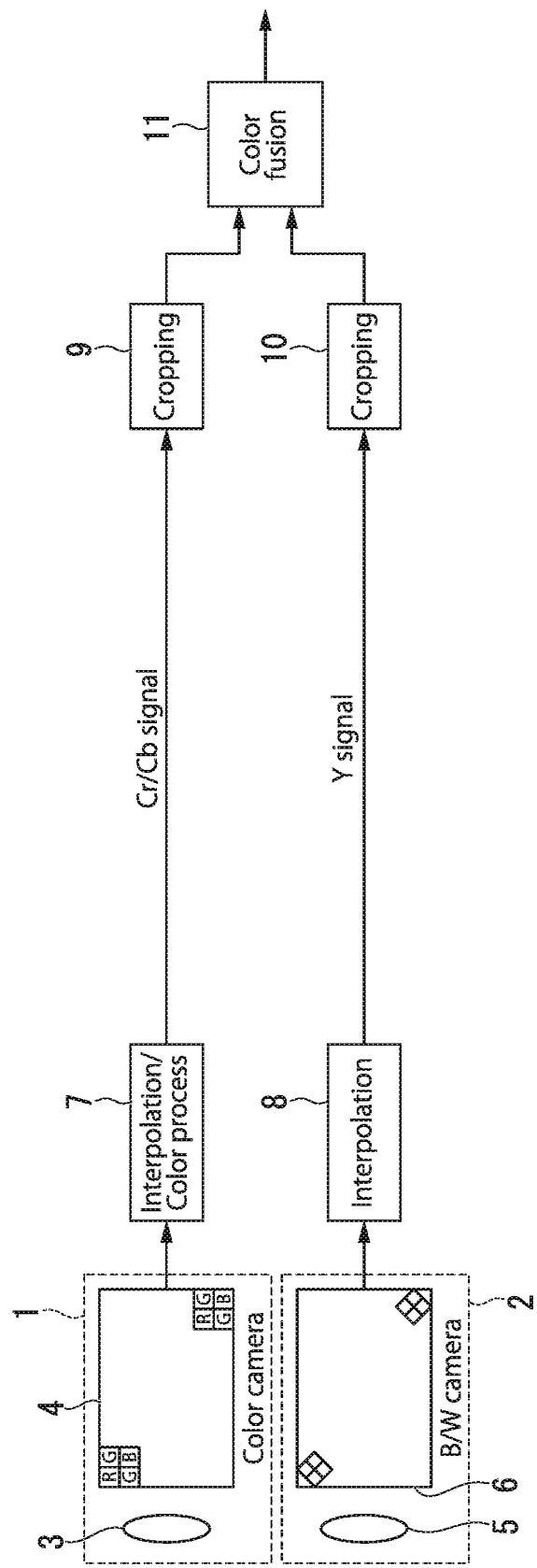
FIG. 4 shows a first example of the configuration of the zoom camera according to the embodiment of the present invention.

FIG. 4 shows a first example of the configuration of the zoom camera according to the embodiment of the present invention. The zoom camera includes a first camera 1 and a second camera 2. The first camera 1 has a first lens 3 and a color image sensor 4 built therein, and the second camera 2 has a second lens 5 and a black/white image sensor 6 built therein. The pixel arrangement of the black/white image sensor 6 is rotated by 45 degrees with respect to the pixel arrangement of the color image sensor 4.

The red, green, and blue signals outputted from the color image sensor 4 are interpolated by a first interpolation means 7 to produce a composite color signal (a set of red, green, and blue signals) at the position of each pixel, and a set of red, green, and blue signals is transformed to a set of a luminance signal Y and color difference signals Cb and Cr. The first interpolation means 7 outputs the color difference signals Cb and Cr.

The luminance signals outputted from the black/white image sensor 6 are interpolated by a second interpolation means 8, and interpolated luminance signals Y are outputted.

The color difference signals Cb and Cr are inputted to first cropping means 9, which cuts out a necessary range from the entire image. The interpolated luminance signals Y are inputted to a second cropping means 10, which also cuts out a necessary range from the entire image. The color difference signals and the luminance signals after the cropping are fused by a color image signal processing means 11. The resolution of the color difference signals is lower than the resolution of the luminance signals, but the difference in the resolution will not cause a viewer to feel that the image is unnatural because the color resolution of the human eye is lower than the luminance resolution thereof.

Figure 5:
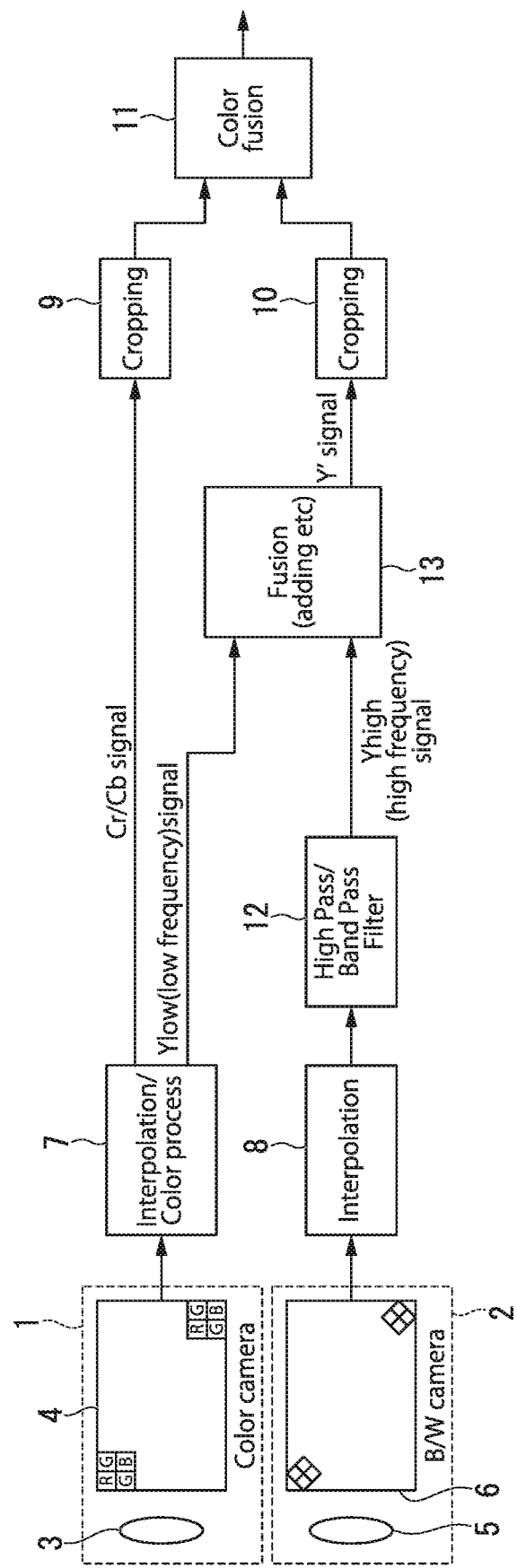
FIG. 5 shows a second example of the configuration of the zoom camera according to the embodiment of the present invention.

FIG. 5 shows a second example of the configuration of the zoom camera according to the embodiment of the present invention. In this example, low-frequency luminance signals Ylow outputted from the first interpolation means 7 are also used.

The first interpolation means 7 produces the color difference signals Cb and Cr and the low-frequency luminance signals Ylow from the color signals, and the low-frequency luminance signals Ylow are inputted to a luminance signal fusing means 13. The interpolated luminance signals outputted from the second interpolation means 8 (high-frequency luminance signals Yhigh) pass through a highpass/bandpass filter 12 and are then inputted to the luminance signal fusing means 13. The low-frequency luminance signals Ylow and the high-frequency luminance signals Yhigh are fused by the luminance signal fusing means 13, and fused luminance signals Y' are inputted to the second cropping means 10. The other configurations are the same as those in the first example.

Figure 6:
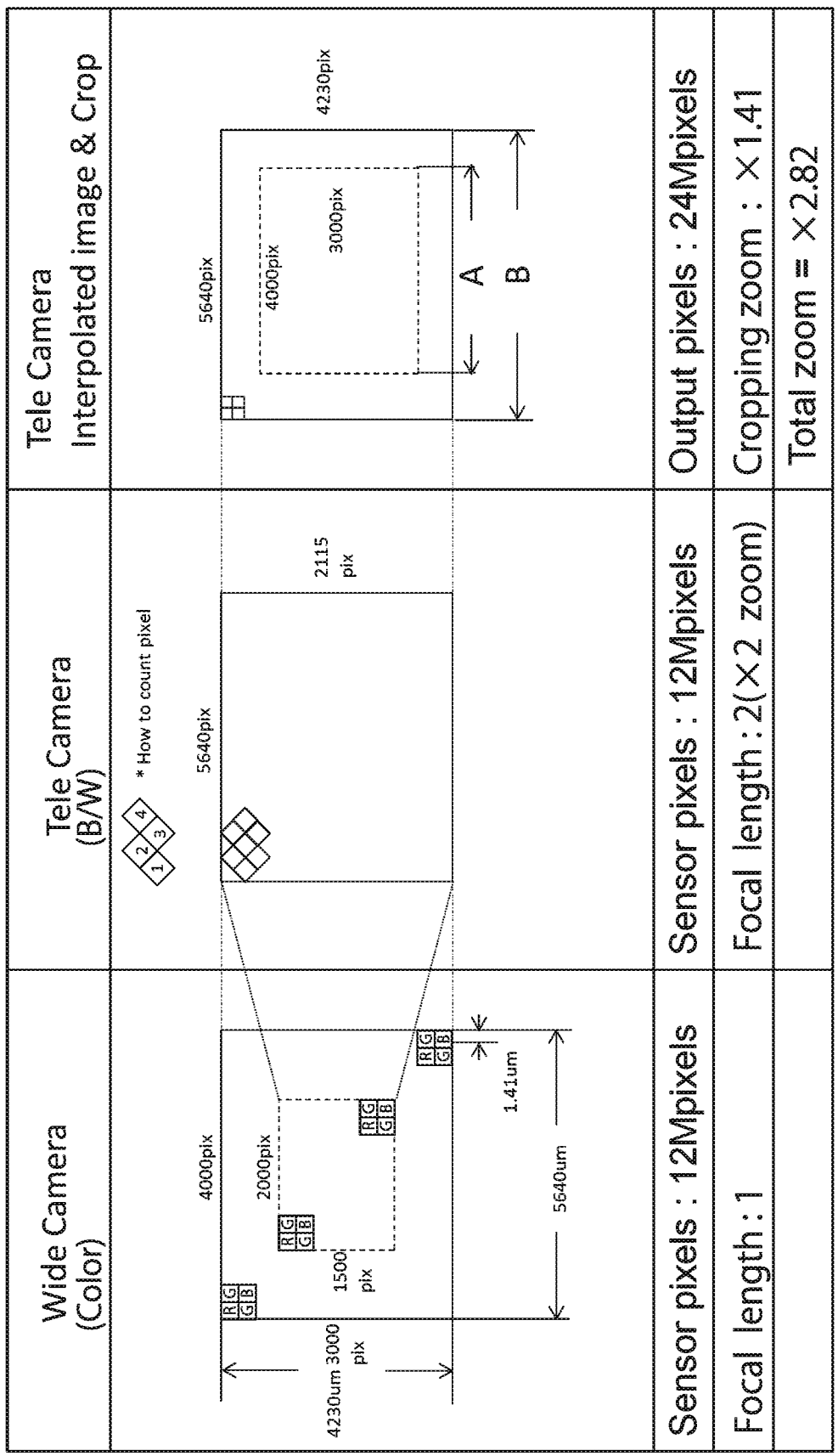
FIG. 6 shows a first embodiment of the present invention.

FIG. 6 shows a first embodiment of the present invention. In this embodiment, the first camera uses a wide-angle lens and the second camera uses a telephoto lens, and the field of view (FOV) of the first camera is set to be about twice the field of view of the second camera. The focal length of the second lens is twice the focal length of the first lens. An image obtained from the first camera and an image obtained from the second camera are fused to achieve "zooming". The total number of pixels of the color image sensor is substantially equal to the total number of pixels of the black/white image sensor. According to this embodiment, a 2× optical "zoom" lens (two lenses having different focal lengths in practice) can be used to achieve about 3× "zooming".

Specifically, the total number of pixels of the color image sensor is 3000×4000=12 M pixels, and the total number of pixels of the black/white image sensor is substantially the same.

The pixel arrangement of the black/white image sensor is rotated by 45 degrees with respect to the pixel arrangement of the color image sensor. Therefore, as far as the luminance single is concerned, the pitch between the interpolated pixels obtained from the black/white image sensor is about 0.71 (1/(the square root of 2)) times the pitch between the interpolated pixels obtained from the color image sensor. The post-interpolation resolution obtained from the black/white image sensor is therefore about 1.4 (the square root of 2) times the post-interpolation resolution obtained from the color image sensor. This means that an image obtained from the black/white image sensor can be cropped and enlarged by a factor of about 1.4 times at the maximum with no decrease in the resolution, as compared with an image obtained from the color image sensor.

Since the total zoom ratio is the product of the optical zoom ratio and the cropping-related zoom ratio, about 3× zooming can be achieved. In this case, since the optical zoom ratio only needs to be 2×, the focal length of the lens can be shortened as compared with a case where 3× optical zooming is provided. As a result, the overall length of the camera can be shortened.

Figure 7:
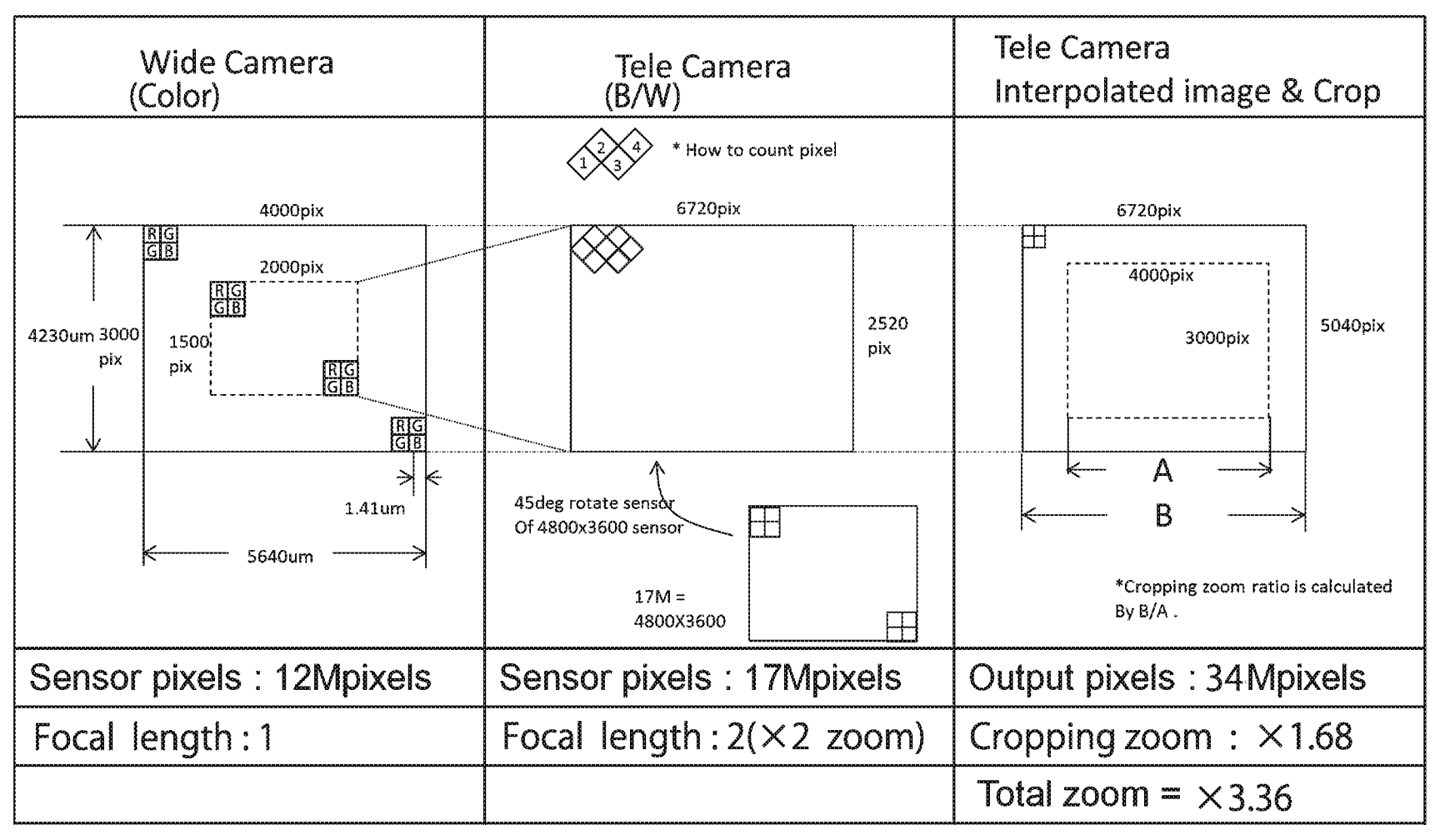

FIG. 7 shows a second embodiment of the present invention. Setting the total number of pixels of the black/white image sensor to be greater than the total number of pixels of the color image sensor allows a higher zoom ratio to be achieved. For example, setting the total number of pixels of the black/white image sensor at 17 M pixels with respect to the total number of pixels of 12 M pixels in the color image sensor allows an increase in the resolution by a factor of about 1.7 because the number of pixels increases. Use of 2× optical zooming (twice-longer-focal-length lens in practice) allows about 3.4× zooming to be achieved.

What is claimed is:

1. A zoom camera comprising:
   a first camera including a first lens and a color image sensor covered with color filters located in front of square pixels;
   a second camera including a second lens and a mono color image sensor having square pixels, with a pixel arrangement of the mono color image sensor rotated by 45 degrees with respect to a pixel arrangement of the color image sensor;
   a first interpolation means for interpolating signals outputted from the color image sensor, converting the interpolated signals into color difference signals, and outputting the color difference signals;
   a second interpolation means for interpolating signals outputted from the mono color image sensor and outputting interpolated luminance signals;
   a first cropping means for cropping the color difference signals;
   a second cropping means for cropping the interpolated luminance signals; and
   a color image signal processing means for fusing the cropped color difference signals and the cropped luminance signals.

2. The zoom camera according to claim 1, wherein the color filters are Bayer patterned color filters, and both interpolation of signals outputted from the pixels each covered with a green filter in the color image sensor performed by the first interpolation means and interpolation of signals performed by the second interpolation means use the same algorithm.

3. The zoom camera according to claim 1, wherein a focal length of the second lens is longer than a focal length of the first lens.

4. The zoom camera according to claim 1, wherein a total number of pixels provided in the mono color image sensor is substantially equal to a total number of pixels provided in the color image sensor.

5. The zoom camera according to claim 1, wherein a total number of pixels provided in the mono color image sensor is greater than a total number of pixels provided in the color image sensor.

6. A zoom camera comprising:
   a first camera including a first lens and a color image sensor covered with color filters located in front of square pixels;
   a second camera including a second lens and a mono color image sensor having square pixels, with a pixel arrangement of the mono color image sensor rotated by 45 degrees with respect to a pixel arrangement of the color image sensor;

a first interpolation means for interpolating signals outputted from the color image sensor, converting the interpolated signals into color difference signals and low-frequency luminance signals, and outputting the color difference signals and the low-frequency luminance signals;

a second interpolation means for interpolating signals outputted from the mono color image sensor and outputting high-frequency luminance signals;

a luminance signal fusing means for fusing the low-frequency luminance signals and the high-frequency luminance signals and outputting fused luminance signals;

a first cropping means for cropping the color difference signals;

a second cropping means for cropping the fused luminance signals; and a color image signal processing means for fusing the cropped color difference signals and the cropped luminance signals.

7. The zoom camera according to claim 6, wherein the color filters are Bayer patterned color filters, and both interpolation of signals outputted from the pixels each covered with a green filter in the color image sensor performed by the first interpolation means and interpolation of signals performed by the second interpolation means use the same algorithm.

8. The zoom camera according to claim 6, wherein a focal length of the second lens is longer than a focal length of the first lens.

9. The zoom camera according to claim 6, wherein a total number of pixels provided in the mono color image sensor is substantially equal to a total number of pixels provided in the color image sensor.

10. The zoom camera according to claim 6, wherein a total number of pixels provided in the mono color image sensor is greater than a total number of pixels provided in the color image sensor.

* * * * *